No. 708,582. Patented Sept. 9, 1902.
M. F. POTTER.
MILK PAIL ATTACHMENT.
(Application filed Apr. 26, 1902.)

(No Model.) 2 Sheets—Sheet 1.

Witnesses,
W. H. Palmer.
Emily Eastman.

Inventor
Millard F. Potter.
by Lothrop Johnson
his Attorneys.

No. 708,582. Patented Sept. 9, 1902.
M. F. POTTER.
MILK PAIL ATTACHMENT.
(Application filed Apr. 26, 1902.)
(No Model.) 2 Sheets—Sheet 2.

Witnesses.
W. H. Palmer
Emily Eastman

Inventor,
Millard F. Potter.
by Lothrop Johnson
his Attorneys.

THE NORRIS PETERS CO., PHOTO-LITHO., WASHINGTON, D. C.

UNITED STATES PATENT OFFICE.

MILLARD F. POTTER, OF ST. PAUL, MINNESOTA.

MILK-PAIL ATTACHMENT.

SPECIFICATION forming part of Letters Patent No. 708,582, dated September 9, 1902.

Application filed April 26, 1902. Serial No. 104,793. (No model.)

*To all whom it may concern:*

Be it known that I, MILLARD F. POTTER, a citizen of the United States, residing at St. Paul, in the county of Ramsey and State of Minnesota, have invented certain new and useful Improvements in Milk-Pail Attachments, of which the following is a specification.

My invention relates to improvements in milk-pail attachments, its object being to provide an attachment which can be used in connection with a milk-pail to strain the milk as it passes into the pail and which will hold the milk in the pail when the pail is upset, such attachment being also adapted to be used as a ventilating-cover for the ordinary milk-can.

To this end my invention consists in the features of construction and combination hereinafter particularly described and claimed.

Figure 1:
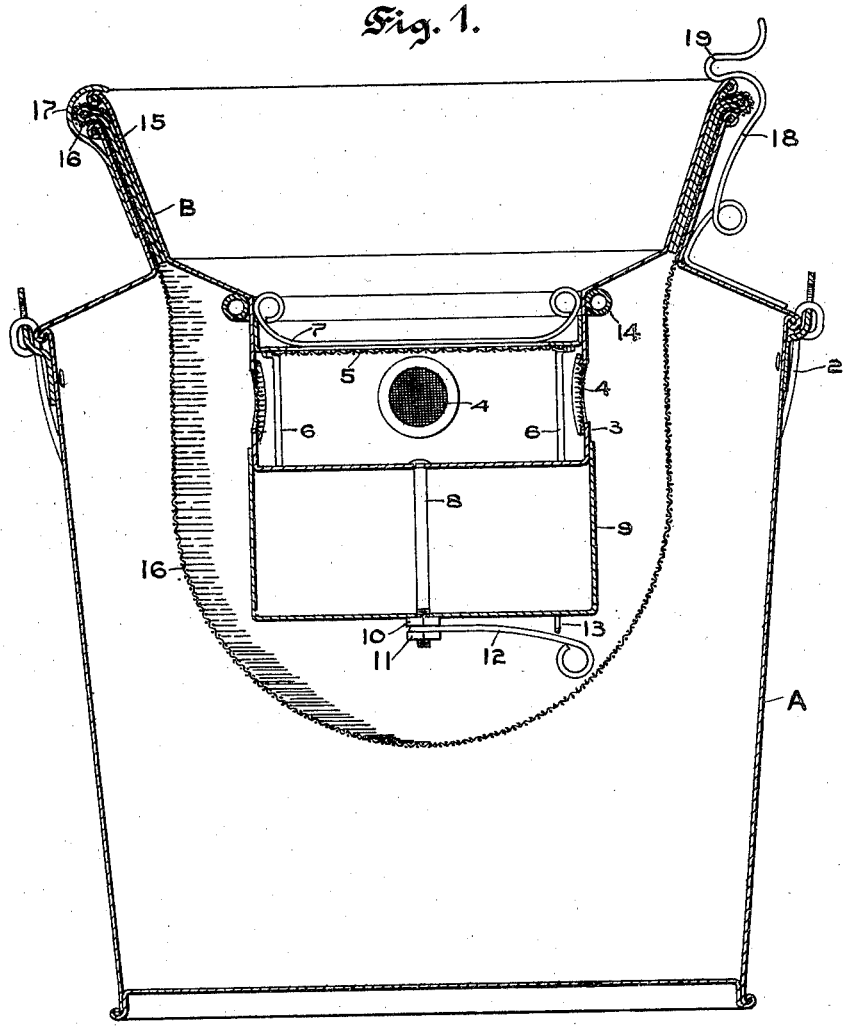
Figure 2:
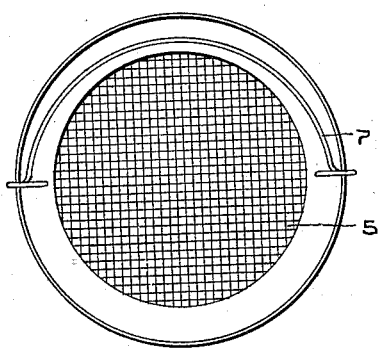
Figure 3:
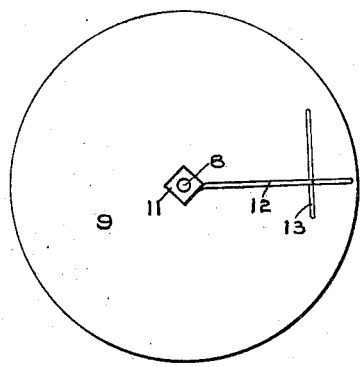
Figure 4:
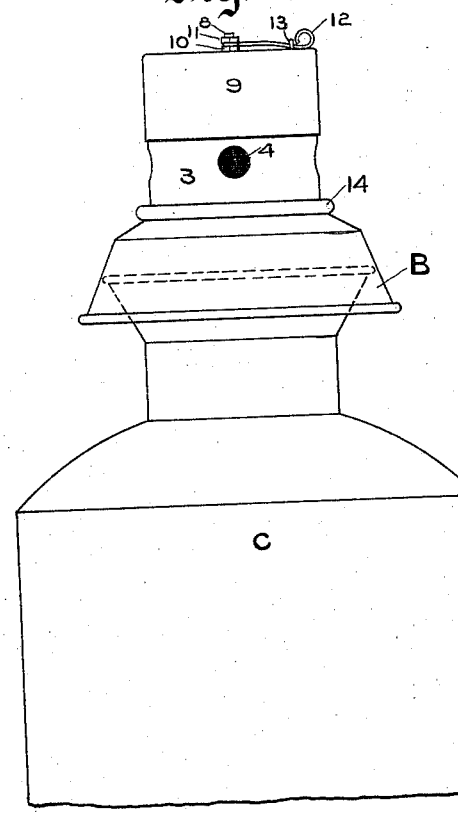
Figure 5:
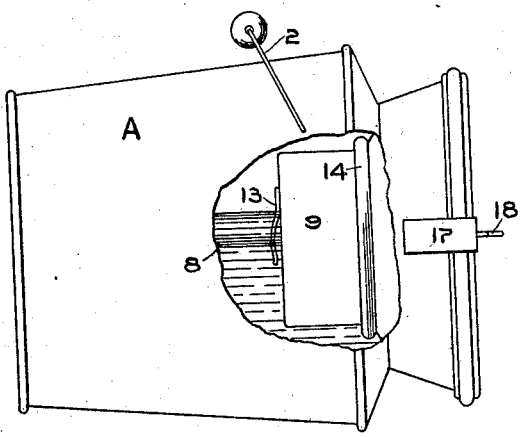

In the accompanying drawings, forming part of this specification, Figure 1 is a vertical cross-section of a milk-pail provided with my attachment. Fig. 2 is a top view of the strainer forming part of the attachment. Fig. 3 is a bottom view of the closing-cap forming part of said attachment. Fig. 4 is a side elevation of the upper portion of a milk-can shown covered by my improved attachment; and Fig. 5 is a side elevation of a milk-pail, the same being shown turned on its side and partially broken away to show the closed position of the attachment.

In the drawings, A represents an ordinary milk-pail provided with a bail 2. Adapted to be fitted within the opening of the pail is a funnel B, forming part of my attachment. The funnel B is formed with a closed bottom or bucket portion 3. Formed in the side of the portion 3 some distance above the bottom are a series of openings covered with screening 4. Arranged in the bucket portion 3 is a strainer 5, said strainer being supported above the screens 4 by downwardly-projecting legs 6 and being held in place by a spring 7, secured to the strainer and bearing at its ends against the inner wall of the funnel, as shown in Fig. 1. Projecting downwardly from the bottom 3 of the funnel is a rod 8, upon which is slidably supported a cap 9, said cap being held upon said rod by nuts 10 and 11. Secured between the nuts 10 and 11 is a spring 12, the outer end of which is adapted to coöperate with a catch 13, secured to the bottom of the cap. Secured around the funnel B, at the lower end of the flaring portion thereof, is a rubber tube 14, against which the cap 9 is adapted to abut when in closed position, as shown in Fig. 5.

Secured between the wall of the funnel and the mouth of the pail is the rubber gasket 15 and the fabric bag 16, the bag 16 inclosing, as shown in Fig. 1, the funnel and connected parts. The funnel is held in the mouth of the pail by means of a catch 17, secured to one side of the pail and adapted to fit over the adjacent edge of the funnel, and by a spring 18, secured to the opposite side of the pail and formed with an inturned end 19 to engage with the upper edge of the funnel.

My attachment is used as follows: The funnel and connected parts are secured in the mouth of the pail, as shown in Fig. 1. As the milk passes into the pail it will first pass through the screen 5, which will hold back hair and large particles of dirt. From the lower portion 3 of the funnel the milk will pass through the screens 4, which will hold back the finer particles of foreign matter, which will drop to the bottom of the portion 3, the strained milk passing into the bag 16 and through said bag into the body of the pail. The milk is thus thoroughly strained before it passes into the body of the pail. If the pail is accidentally upset or kicked over by the cow, the cap 9 will slide upon the rod 8 into the position shown in Fig. 5, closing the screen-openings 4 and preventing any milk passing from the pail.

When the attachment is to be used with a milk-can, it is removed from the milk-pail and placed upon the milk-can C in inverted position, as shown in Fig. 4. When used in connection with a milk-can, the cap 9 is secured in open position by interlocking the spring 12 and catch 13. This allows air to pass through the screen-openings 4 to ventilate the milk.

I claim—

1. The combination with a milk-pail, of a funnel, means for securing said funnel in the mouth of said pail, a closed bottom for said funnel, a horizontal strainer arranged in said funnel, the bottom of said funnel being formed with screened openings in its side wall below said horizontal strainer, and a slidable cap fitted over the bottom of said funnel.

2. The combination with a milk-pail, of a funnel, means for holding said funnel in the mouth of said pail, a downwardly-projecting closed bottom carried by said funnel, a horizontal strainer detachably supported in said funnel, the bottom of said funnel being formed with screened openings below said strainer, and a slidable cap arranged in connection with the bottom of said funnel.

3. The combination with a milk-pail, of a funnel, means for detachably supporting said funnel in the mouth of said pail, a downwardly-projecting closed bottom for said funnel, a horizontal strainer detachably supported therein, the bottom of said funnel being provided with screened openings in its side wall below said strainer, a slidable cap fitted over the bottom of said funnel, and means for securing said cap in open position.

4. The combination with a milk-pail, of a funnel, means for supporting said funnel in the mouth of said pail, a downwardly-projecting closed bottom for said funnel, a horizontal strainer detachably supported therein, said funnel being formed with screened openings in its side wall below said strainer, a rubber ring surrounding said funnel, a rod projecting downwardly from the bottom of said funnel, a cap slidably supported on said rod and fitting over the bottom of the funnel, a catch secured to the bottom of said cap, a spring carried by said rod and projecting outward adjacent to said catch, and a fabric bag surrounding said funnel and connected parts.

5. An attachment of the class described, consisting of a funnel provided with a closed end, said funnel being formed with screened openings in its side wall, a cap slidably supported upon the end of said funnel, and means for holding said cap in open position.

6. An attachment of the class described, consisting of a funnel provided with a closed end formed with screened openings in its side wall, a rubber ring surrounding said funnel above said openings, and a cap slidably supported upon the closed end of said funnel.

In testimony whereof I affix my signature in presence of two witnesses.

MILLARD F. POTTER.

Witnesses:
H. S. JOHNSON,
EMILY EASTMAN.